No. 811,703. PATENTED FEB. 6, 1906.
S. E. DAVIS.
DRAFT EQUALIZER.
APPLICATION FILED FEB. 7, 1905.
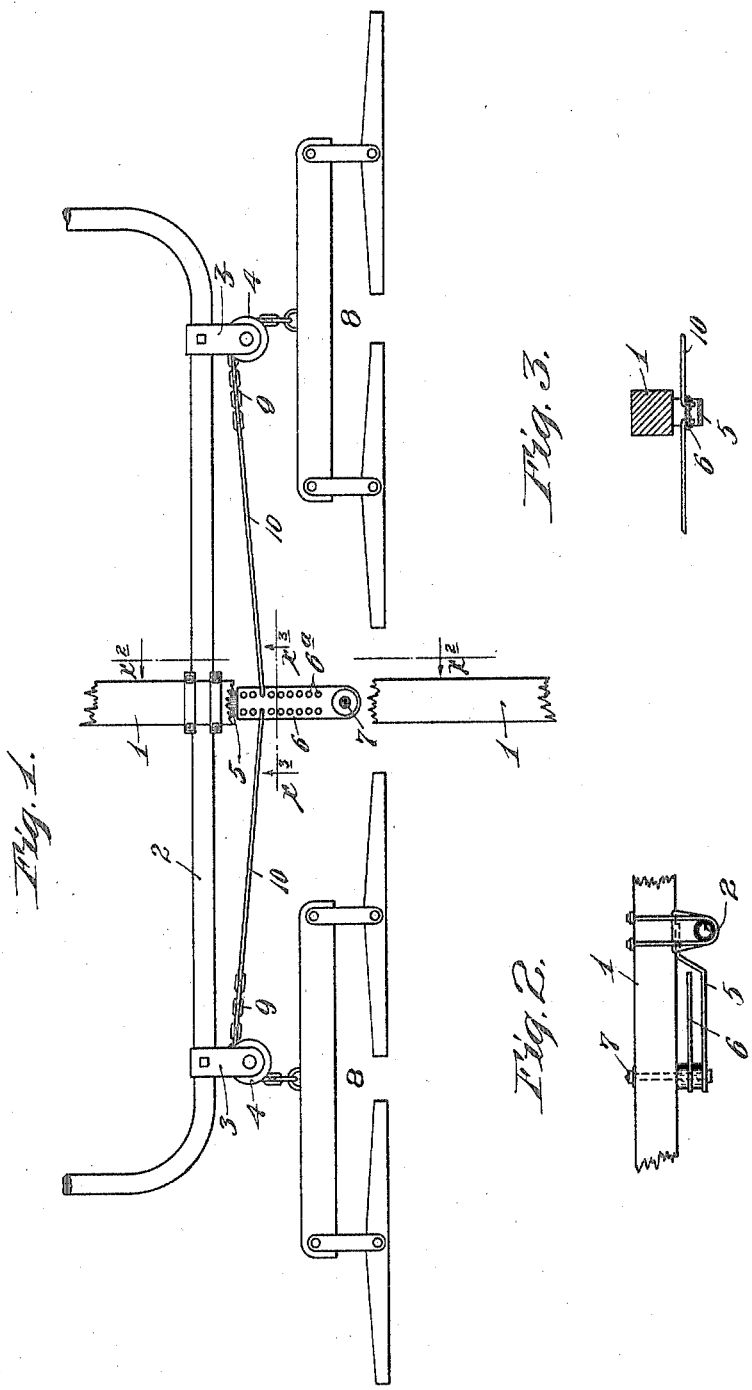
Witnesses.
E. W. Jeppesen.
A. H. Opsahl.
Inventor.
Spencer E. Davis.
By his Attorneys.
Williamson Merchant

UNITED STATES PATENT OFFICE.

SPENCER E. DAVIS, OF MINNEAPOLIS, MINNESOTA.

DRAFT-EQUALIZER.

No. 811,703.  Specification of Letters Patent.  Patented Feb. 6, 1906.

Application filed February 7, 1905. Serial No. 244,534.

*To all whom it may concern:*

Be it known that I, SPENCER E. DAVIS, a citizen of the United States, residing at Minneapolis, in the county of Hennepin and State of Minnesota, have invented certain new and useful Improvements in Draft-Equalizers; and I do hereby declare the following to be a full, clear, and exact description of the invention, such as will enable others skilled in the art to which it appertains to make and use the same.

My invention relates to draft-equalizers, and has for its object to improve the same in the several particulars hereinafter noted.

In the accompanying drawings, which illustrate my invention, like characters indicate like parts throughout the several views.

Figure 1 is a plan view with some parts broken away, showing my improved equalizer applied to the pole and frame of an agricultural implement, such as a disk drill or a cultivator. Fig. 2 is a section on the line $x^2\ x^2$ of Fig. 1, and Fig. 3 is a section on the line $x^3\ x^3$ of Fig. 1.

The numeral 1 indicates the pole, and the numeral 2 a portion of the frame of a disk drill or cultivator. The frame-section 2 serves as a cross-bar rigidly secured to the pole. To the cross-bar 2 on opposite sides of the pole are rigidly secured sheave-brackets 3, in which are journaled guide-sheaves 4. Rigidly secured to the under side of the pole is a metal strap 5, between the forward end of which and the pole is pivoted a vibratory equalizing-lever 6, a bolt 7 being passed through the said parts to afford a pivot for said lever. The lever 6, as shown, projects rearward from its pivot and is provided with two rows of perforations $6^a$.

The numeral 8 indicates two-horse eveners, the beams of which are attached to the outer ends of a flexible connection, preferably made up of chains 9 and rods 10. The chains 9 run over the sheaves 4, and the inner ends of the rods 10 are adapted to be hooked into any of the perforations $6^a$ of the equalizing-lever 6. When the rods 10 are hooked into perforations $6^a$, that are located equidistant from the pivot of the lever 6, it is evident that the draft strains on the opposite side of the pole will be exactly equalized. This is what will usually be desired when the same number of horses (two, for instance) are hitched to the opposite ends of the flexible draft connection, made up of the chains 9 and rods 10. If, however, one team is lighter than the other, that team may be given either a very slight or a considerable advantage over the heavier team by attaching the rod 10 on the light-team side in a perforation $6^a$, that is farther from the pivot of the lever 6. To equalize with one horse on one side of the pole and with two on the other side, the rod 10 on the two-horse side should be coupled into a hole $6^a$, that is only one-half the distance from the pivot of the lever 6, as is the hole into which is coupled the rod on the one-horse side. Again, this exact equalization may be varied by shifting one or the other of the rods 10 into a hole $6^a$ slightly out of the relative positions just noted. The lever 6 normally lies parallel to the pole 1 and approximately at a right angle to the rods 10.

The device described is of small cost, affords means for all desirable equalizations and distributions of the draft strains, and is in all respects extremely efficient for the purposes had in view. This said device is capable of modification within the scope of my invention as herein set forth and claimed.

What I claim, and desire to secure by Letters Patent of the United States, is as follows:

In a machine of the character described, the combination with a pole and a frame having a transversely-extended front bar 2 rigidly secured to said pole, of an equalizing-lever 6 pivoted to said pole with its free end turned rearward and terminating slightly forward of said bar 2, said lever having two parallel rows of perforations, the sheave-bearings 3 secured to said frame-bar 2 on opposite sides of the pole, the sheaves 4 mounted on said sheave-bearings 3, the rods 10 adjustably engaged with the perforations of said equalizing-lever 6, and the chains 9 attached to the outer ends with devices to which horses may be hitched, substantially as described.

In testimony whereof I affix my signature in presence of two witnesses.

SPENCER E. DAVIS.

Witnesses:
H. D. KILGORE,
F. D. MERCHANT.